(12) United States Patent
Venugopalsetty et al.

(10) Patent No.: US 10,772,317 B2
(45) Date of Patent: Sep. 15, 2020

(54) SYSTEMS AND METHODS FOR DETERRING PESTS FROM GAS TURBINE INLET AIR FILTRATION UNITS

(71) Applicant: GENERAL ELECTRIC COMPANY, Schenectady, NY (US)

(72) Inventors: Dinesh Venugopalsetty, Karnataka (IN); Richard Lynn Loud, Ballston Spa, NY (US); Sudhir Ramesh Chaudhari, Karnataka (IN); Venugopala Durwasula Raju, Karnataka (IN); Indrajit Mazumder, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/262,357

(22) Filed: Jan. 30, 2019

(65) Prior Publication Data
US 2019/0246624 A1 Aug. 15, 2019

(51) Int. Cl.
*A01M 29/18* (2011.01)
*A01M 29/34* (2011.01)
*F02C 7/055* (2006.01)

(52) U.S. Cl.
CPC ............ *A01M 29/18* (2013.01); *A01M 29/34* (2013.01); *F02C 7/055* (2013.01); *F05D 2260/607* (2013.01)

(58) Field of Classification Search
CPC ....... A01M 29/18; A01M 29/34; F02C 7/055; F05D 2260/607
See application file for complete search history.

(56) References Cited

U.S. PATENT DOCUMENTS

| | | | | |
|---|---|---|---|---|
| 3,636,559 A | * | 1/1972 | Del Grande | .......... B06B 1/0284 340/384.2 |
| 4,562,561 A | * | 12/1985 | Ackley | ................. A01M 29/18 367/139 |
| 5,598,379 A | * | 1/1997 | Malleolo | ............... A01M 29/18 340/384.2 |
| 7,227,452 B1 | * | 6/2007 | Frost | ..................... A01M 29/18 119/329 |
| 7,324,408 B2 | * | 1/2008 | Cilliers | ................. A01M 29/18 340/384.2 |
| 7,450,473 B1 | * | 11/2008 | Estrada | ................. A01M 29/18 340/384.2 |
| 8,528,493 B1 | * | 9/2013 | Ratigan | ................ A01M 29/18 114/221 R |

(Continued)

*Primary Examiner* — Joshua K Ihezie
(74) *Attorney, Agent, or Firm* — Charlotte C. Wilson; James W. Pemrick (57) ABSTRACT

An inlet air filtration unit for a gas turbine includes an inlet filter house having an upstream surface through which air is ingested. A plurality of weather hoods is secured to the upstream surface. A wave-generating system is installed on or proximate to the plurality of weather hoods, the wave-generating system emitting waves that deter pests from the inlet filter house. A method of deterring pests from entering an inlet filter house of an inlet air filtration system is also provided. The method includes: installing a wave-generating system proximate to or on a weather hood on an upstream surface of the inlet filter house; and energizing the wave-generating system to produce energy waves across the upstream surface of the inlet filter house.

10 Claims, 6 Drawing Sheets

(56) References Cited

U.S. PATENT DOCUMENTS

| | | | |
|---|---|---|---|
| 2009/0034369 A1 | 2/2009 | Hill | |
| 2010/0037777 A1* | 2/2010 | Davis | B01D 53/30 96/228 |
| 2010/0154631 A1* | 6/2010 | Chillar | F02C 7/052 95/63 |
| 2013/0077446 A1* | 3/2013 | Kasper | A01M 29/18 367/139 |
| 2014/0169138 A1* | 6/2014 | Lee | A01M 29/18 367/139 |
| 2015/0219010 A1* | 8/2015 | Santini | F01D 25/002 60/39.092 |
| 2015/0322859 A1* | 11/2015 | Van Den Bossche | B01D 46/002 60/39.092 |
| 2016/0338337 A1* | 11/2016 | Waldman | A01M 31/002 |
| 2017/0002739 A1* | 1/2017 | Ramirez | F02C 7/052 |
| 2018/0092346 A1* | 4/2018 | Kim | A01M 29/18 |

* cited by examiner

SYSTEMS AND METHODS FOR DETERRING PESTS FROM GAS TURBINE INLET AIR FILTRATION UNITS

TECHNICAL FIELD

Embodiments of the present disclosure relate to inlet air filtration units for power plants including one or more thermal machines whose operation requires filtered air for combustion and/or ventilation purposes. In particular, the disclosure relates to systems for deterring flying insects and other pests (e.g., moths and spiders) from entering the inlet air filtration units.

BACKGROUND

Power generation equipment, such as a gas turbine engine, may use a large amount of intake air to support the combustion process. In some instances, the intake air is laden with dust particles, salt, and other types of contaminants, which may damage the compressor blades and other turbine components, via corrosion and erosion, for example. Such component damage may impact the efficiency and performance of the gas turbine engine and may result in more frequent maintenance intervals.

To reduce the problems caused by impure intake air, inlet air filtration units are often used upstream of the compressor. The intake air generally passes through a series of filters and screens to assist in removing the contaminants before they can reach the compressor. Further, the filters and screens may normalize the velocity and pressure of the inlet air flow. The inlet air filtration unit may include an upstream water separation filter for removing water from the inlet (intake) air and one or more downstream filtration modules for removing dust and other impurities.

It has been observed that the number of flying insects (e.g., moths) increases dramatically during monsoon or rainy seasons, which provide damp breeding grounds for such insects. It is common for the flying insects to be drawn toward the lights of the power plant and to be sucked into the compressor's inlet air filtration system, where their ingestion clogs the filters and inhibits the flow of air therethrough. The reduced airflow can cause disruptions to the operation of the gas turbine, which may necessitate the gas turbine being taken off-line for filter cleaning and/or replacement.

To combat this problem, although seasonal and temporary, many power plant operators have installed a large inlet screen with a very fine pore size across the most upstream surface of the inlet air filtration unit (i.e., further upstream of the upstream water separation filter). The inlet screen catches debris, such as insects or bits of paper, and prevents its ultimate ingress into the air filters. Because the inlet screen is a permanent fixture to the inlet air filtration system and must be durable to changing weather conditions, the inlet screen is typically made of stainless steel, which contributes significantly to its cost. In addition to its considerable cost, the inlet screen also results in a pressure drop in the air flow entering the compressor, leading to an undesirable loss in power output for the gas turbine.

It would be useful, therefore, to provide a system to deter insect populations from approaching the inlet air filtration system, thereby eliminating the need for the costly screen and its associated pressure drop, reducing the likelihood of insects being trapped in the air filters, and ensuring the reliable and efficient operation of the gas turbine.

SUMMARY

An inlet air filtration unit for a gas turbine includes an inlet filter house having an upstream surface through which air is ingested. A plurality of weather hoods is secured to the upstream surface. A wave-generating system is installed on or proximate to the plurality of weather hoods, the wave-generating system emitting waves that deter pests from the inlet filter house.

A method of deterring pests from entering an inlet filter house of an inlet air filtration system is also provided. The method includes: installing a wave-generating system proximate to or on a weather hood on an upstream surface of the inlet filter house; and energizing the wave-generating system to produce energy waves across the upstream surface of the inlet filter house.

BRIEF DESCRIPTION OF DRAWINGS

The specification, directed to one of ordinary skill in the art, sets forth a full and enabling disclosure of the present products and methods, including the best mode of using the same. The specification refers to the appended figures, in which.

DETAILED DESCRIPTION

The following detailed description illustrates systems for deterring flying insects and other pests (e.g., spiders) from entering inlet air filtration units, the systems being provided by way of example and not limitation. The description enables one of ordinary skill in the art to make and use the present systems in the manner prescribed herein to deter insects and other pests. The description provides different embodiments of the present systems, including what are presently believed to be the best modes of making and using the present systems. The present pest-deterrent methods are described herein as being used at the entry to the inlet air filtration unit of a heavy-duty gas turbine assembly. However, it is contemplated that the pest-deterrent methods and the corresponding systems described herein have general application to a broad range of systems in a variety of fields other than electrical power generation.

As used herein, the terms "first", "second", and "third" may be used interchangeably to distinguish one component or embodiment from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the terms "circumference" or "perimeter" (or any variations thereof) refer to a dimension extending around a center of any suitable shape (e.g., a square, a rectangle, a triangle, etc.) and is not limited to a dimension extending around a center of a circular shape.

Figure 1:
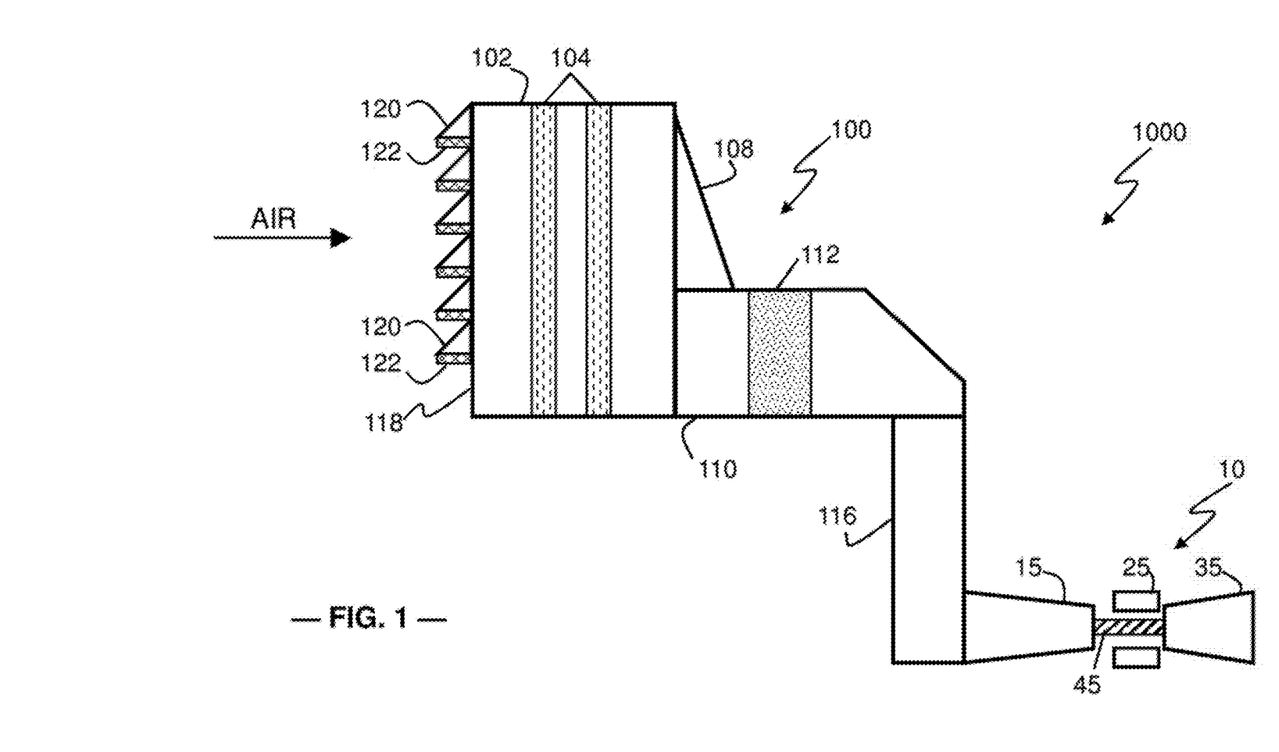
FIG. 1 is a schematic illustration of a gas turbine system with an inlet air filtration unit, as may be equipped with one of the present pest-deterrent systems.

FIG. 1 is a schematic side view of a gas turbine system 1000 having an inlet air filtration unit 100 upstream of a gas turbine 10. The inlet air filtration unit 100 may include one or more stages of filters 104 within a large (e.g., multi-story) filter house 102. A compressor 15 draws air into the inlet air filtration unit 100. Air passes through the filter stage(s) 104 and into a transition duct 108, which fluidly couples the inlet filter housing 102 to an intermediate duct 110. In some instances, an inlet silencer 112 or an inlet bleed heat system (not shown) may be disposed within the intermediate duct 110. Downstream of the intermediate duct 110, an inlet air plenum 116 delivers the filtered airflow to the compressor 15. The inlet air plenum 116 is in fluid communication with intermediate duct 110.

The compressor 15 compresses the air and directs the compressed air into a compressor discharge case (not shown) that at least partially surrounds one or more combustors 25 of the gas turbine 10. Within the combustor 25, the compressed air is combined with fuel and burned to produce combustion products that drive a turbine 35 to produce mechanical work. The compressor 15 and the turbine 35 may be coupled to one another along a common shaft 45, which may further be coupled to a generator (not shown) to produce electricity. The gas turbine engine 10 may be any one of a number of different gas turbine engines having an annular combustor or a set of can-annular combustors disposed about the rotor connecting the compressor 15 to the turbine 35. Other components and configurations may be used herein.

The inlet air filtration system 100 also may include a stacked set of weather hoods 120, which are intended to prevent weather elements, such as rain, snow, and the like, from entering the filter house 102. The weather hoods 120 generally have the shape of a right triangular prism with sides that are rectangular and end walls that are triangular. The weather hoods 120 are mounted on an upstream surface 118 of the filter house 102. Each weather hood 120 includes a screen portion 122 on the open, downward-facing rectangular side of the weather hood. The incoming airflow passes through the screen portion 122 and into the filter house 102.

Figure 2:
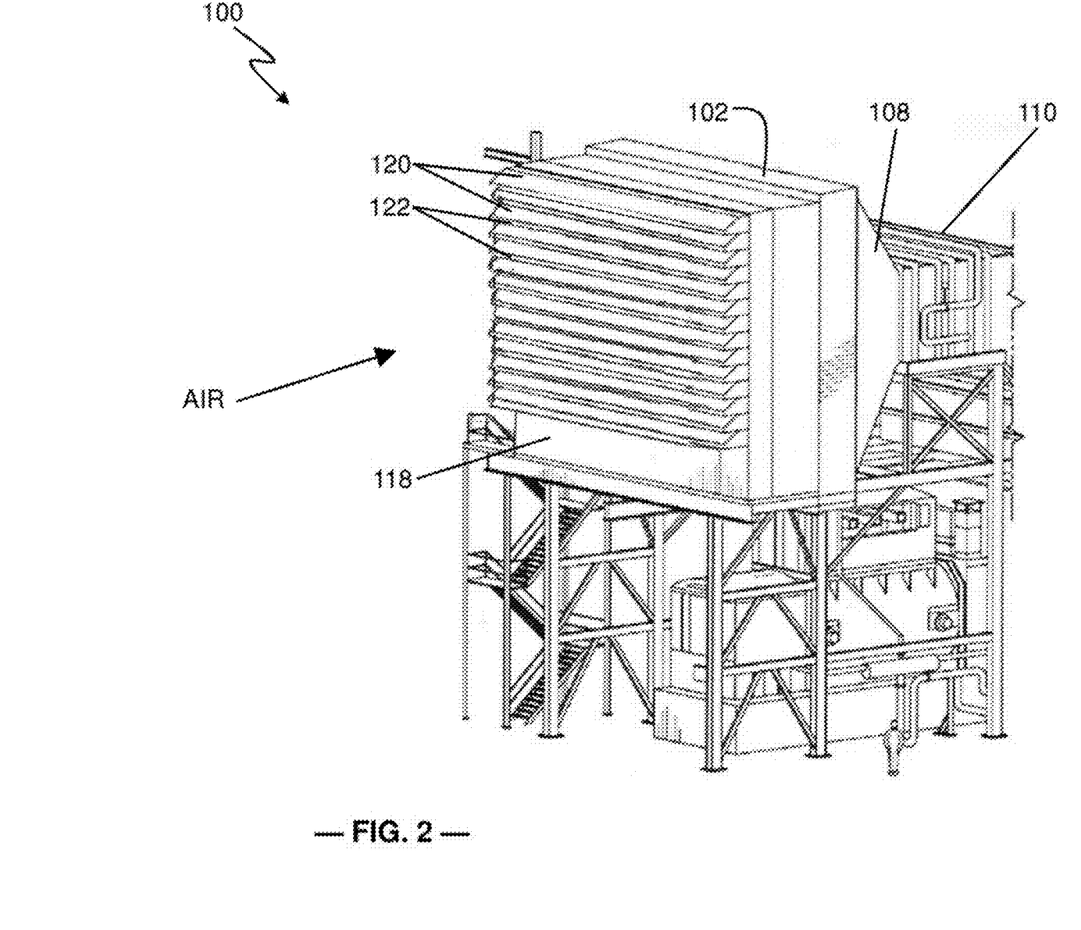
FIG. 2 is a perspective view of the inlet air filtration unit of FIG. 1.

FIG. 2 is a perspective view of the inlet air filtration system 100, which shows the weather hoods 120 extending from the upstream surface 118 of the inlet filter house 102. The inlet air filtration system 100 may be elevated above ground level, as shown.

Figure 3:
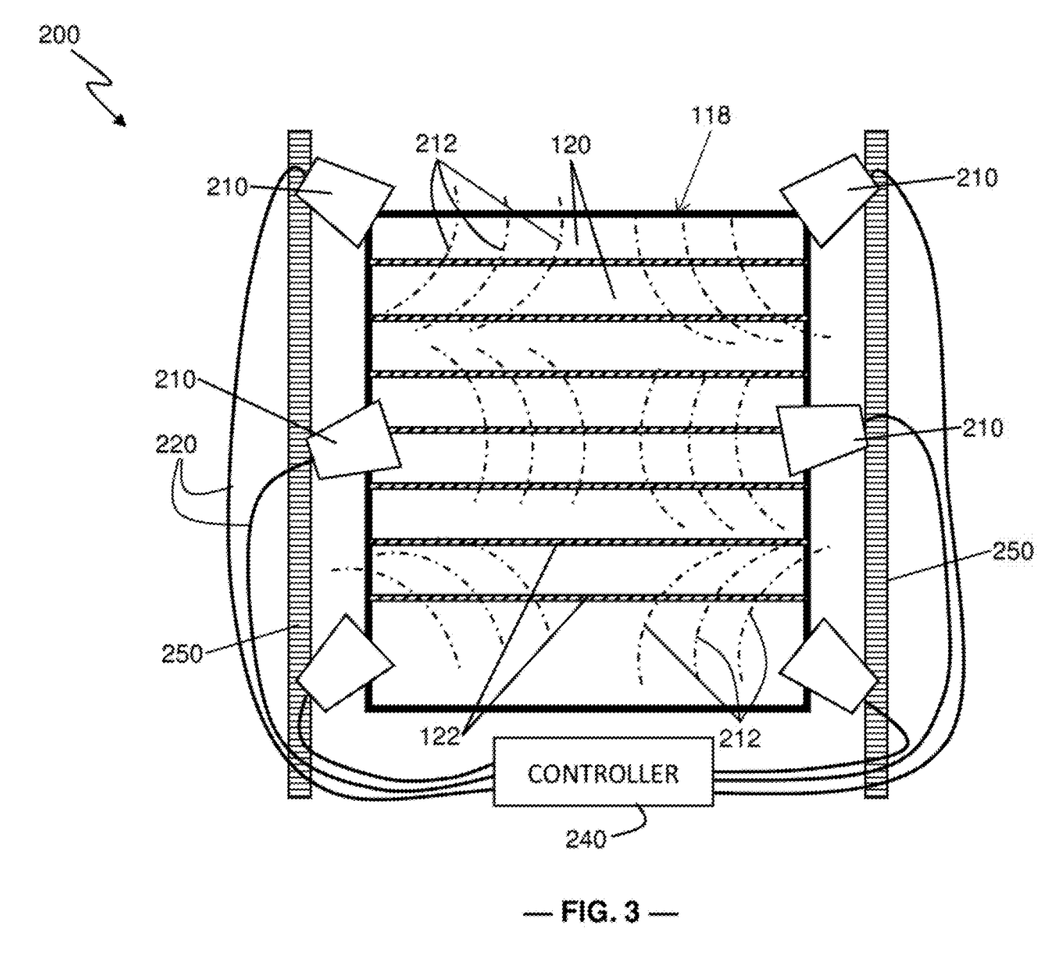
FIG. 3 is a schematic front view of an upstream surface of the inlet air filtration unit and an ultrasonic pest-deterrent system, according to a first aspect of the present disclosure.

FIG. 3 is a schematic front view of the upstream surface 118 of the inlet filter house 102, showing a system 200 of pest-deterring, wave-generating devices 210 in an exemplary arrangement. The pest-deterring, wave-generating devices 210 of the system 200 are ultrasonic speakers directed at the upstream surface 118. The ultrasonic speakers 210 produce sound waves 212 in at least one ultrasonic frequency, or frequency range, greater than 20 kHz, as a means of pest deterrence. While humans cannot hear sounds in this range, insects, such as grasshoppers and locusts, can detect sound waves at frequencies as high as 50 kHz to 100 kHz. Moths and lacewings have been reported as detecting ultrasonic waves as high as 240 kHz to 300 kHz.

In one embodiment, all the speakers 210 produce ultrasonic waves of the same ultrasonic frequency in kHz (±5%). In another embodiment, the speakers 210 produce two or more different frequencies (having frequencies with differences greater than 5% from one another). The number of ultrasonic speakers 210 and their locations may be chosen to ensure that the entire surface area of the upstream surface 118 is blanketed in ultrasonic waves 212. Because the sound waves are above the frequency heard by humans, the use of the ultrasonic speakers 210 does not increase the noise produced by the power plant, thus allowing the power plant to remain in compliance with any applicable noise regulations.

The ultrasonic speakers 210 are connected, via wires 220, to a controller 240 that controls the operation of the speakers 210. The ultrasonic speakers 210, wires 220, and the controller 240 are part of the system 200. Advantageously, the ultrasonic speakers 210 may be used in monsoon season or in other periods where the pest populations are particularly high and may be turned off during dry weather or in periods where the pest populations are relatively low. Further, because the ultrasonic speakers 210 do not disrupt the air flow into the inlet filter house 102, the air entering the compressor 15 does not experience the pressure drop associated with the stainless-steel inlet screen described above.

As shown in FIG. 3, the ultrasonic speakers 210 may be mounted to poles 250 positioned near the upstream surface 118. Alternately, the ultrasonic speakers 210 may be mounted directly to the inlet filter house 102 and possibly to the weather hoods 120 themselves.

Figure 4:
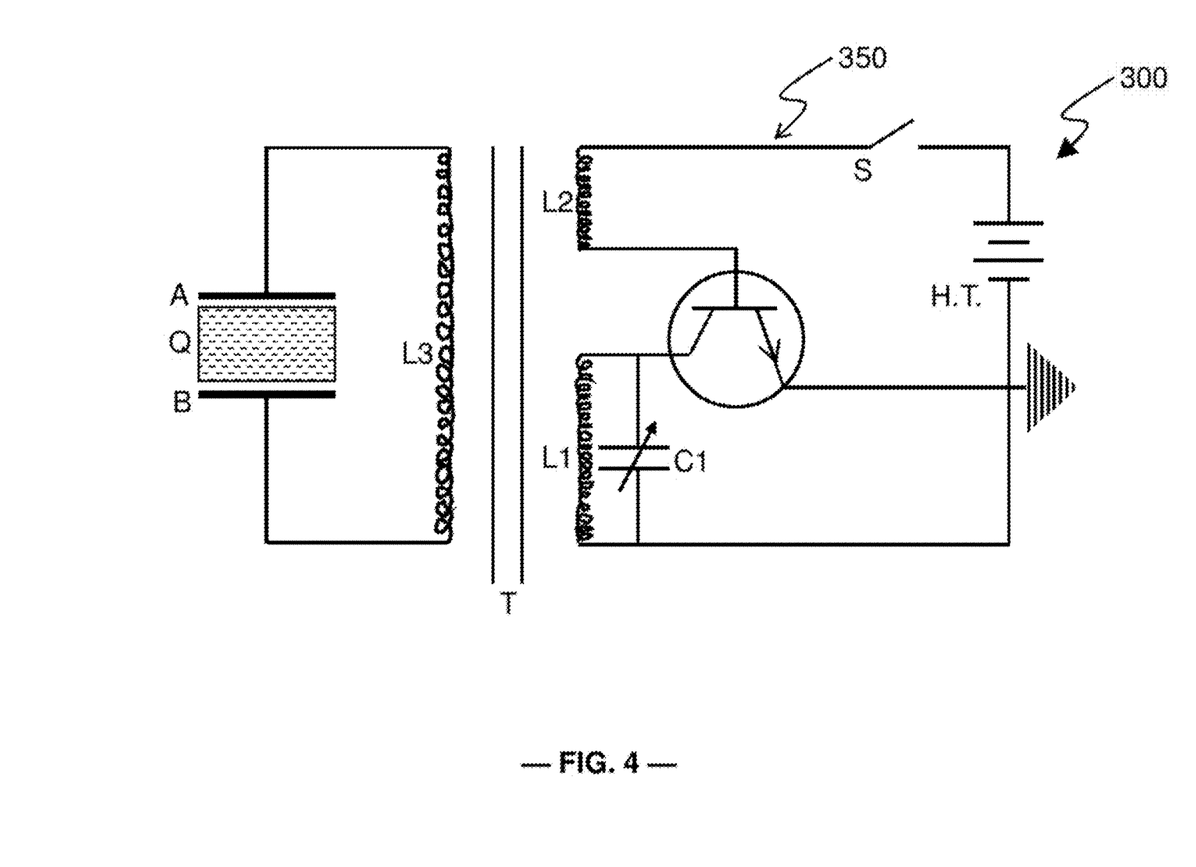
FIG. 4 is a schematic diagram of a piezo-electric oscillator as may be used in the ultrasonic pest-deterrent system of FIG. 3.

The ultrasonic speakers 210 may produce ultrasonic waves by employing a piezo-electric generator 300 or oscillator (as shown in FIG. 4). In FIG. 4, a quartz crystal Q is placed between two metal plates A, B. The plates are connected to a primary coil L3 of a transformer T, which is inductively coupled to an electronics oscillator circuit 350. The electronics oscillator circuit 350 includes a base coil L1, which forms a tank circuit with a variable capacitor C1, and a collector coil L2, which is inductively coupled to the base coil L1. The base coil L1 and the collector coil L2 are taken from the secondary of the transformer T.

When the battery H.T. is switched on, via switch S, the electronics oscillator circuit 350 produces high frequency alternating voltages having a frequency f. An oscillatory electromagnetic force is induced in the coil L3, which feeds the metal plates A and B. The quartz crystal Q experiences an inverse piezo-electric effect, in which the crystal contracts and expands alternatively, resulting in mechanical vibrations. The capacitor C1 is adjusted, so that the frequency of the applied voltage is equal to the natural frequency of the quartz crystal Q, so that resonance occurs. The quartz crystal Q may be replaced with another suitable material, such as tourmaline, Rochelle salt, or the like material, which have faces perpendicular to the optic axis.

Figure 5:
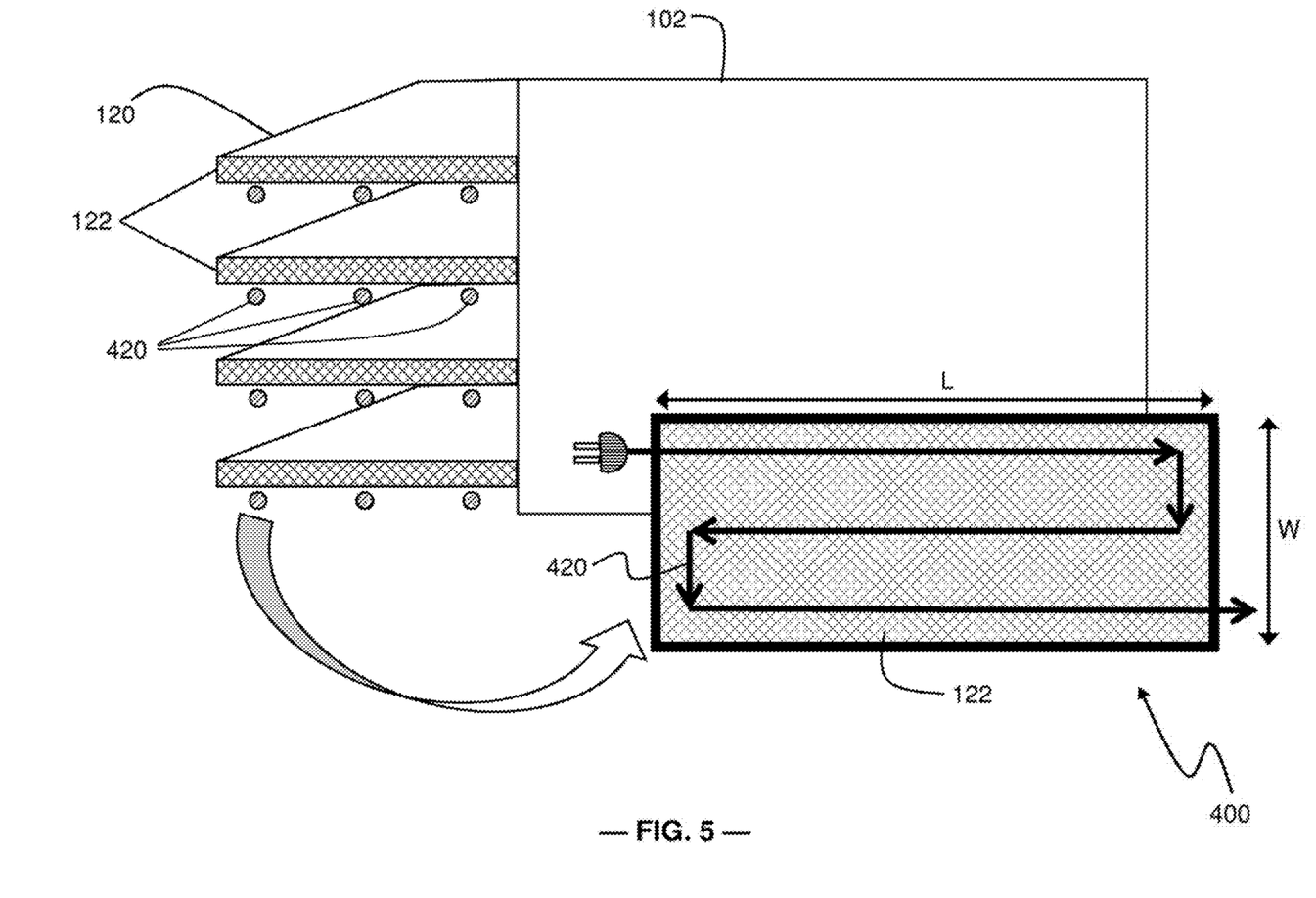
FIG. 5 is a schematic side view of the inlet air filtration unit and an electromagnetic pest-deterrent system, according to a second aspect of the present disclosure, and includes a plan view of a portion of the electromagnetic pest-deterrent system as installed on a portion of the inlet air filtration unit.

FIG. 5 illustrates a side view of a portion of the inlet air filtration system 100, according to another aspect of the present disclosure, along with a plan view of the screen portion 122 of a weather hood 120. In this aspect, a pest-deterring, wave-generating system 400 includes a solenoid assembly 410 (shown in FIG. 6) and a series of cables 420. The solenoid assembly 410 generates electromagnetic waves that are propagated through the cables 420 to deter pests from approaching the inlet filter house 102. As electrons move through the cables 420, a magnetic field is produced, radiating outward from the cables 420. The electromagnetic waves may have a frequency in the range of $10^0$ Hz to $10^6$ Hz.

The cables 420 are secured across the length ("L") and width ("W") of the screen portions 122 of the weather hoods 120 and are positioned to produce an electromagnetic field that covers the surface area of the screen portion 122. The circuitous cable arrangement shown in FIG. 5 is merely exemplary of one possible arrangement that may be used.

If desired, a single cable 410 may be installed across the screen portions 122 of consecutive weather hoods 120 in sequence (e.g., starting at the uppermost weather hood and working downward to the lowermost weather hood, or vice versa). Alternately, each screen portion 122 may have its own cable 410, and each respective cable 410 may be connected sequentially to one another and/or may be connected individually to a power source.

Figure 6:
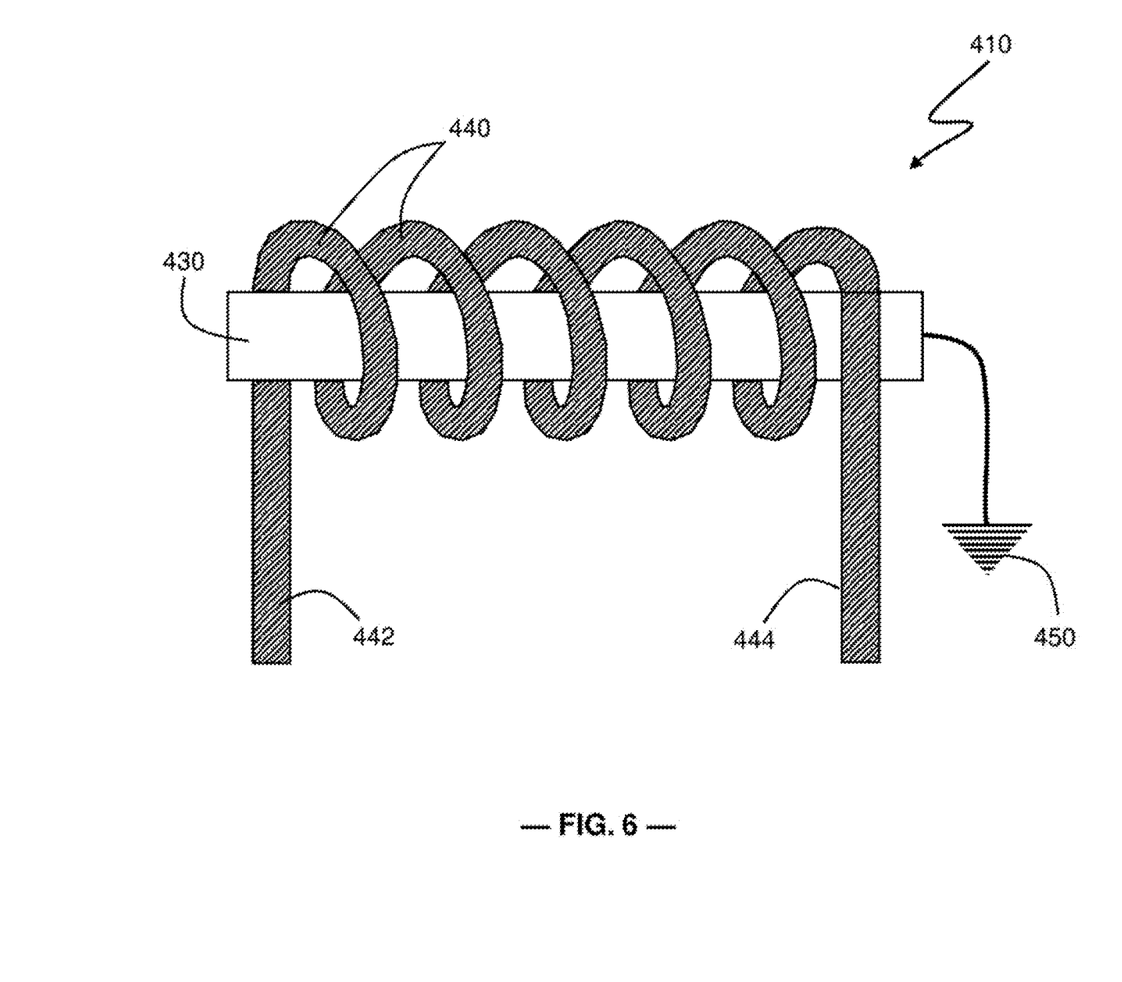
FIG. 6 is a schematic diagram of a solenoid assembly as may be used with the pest-deterrent system of FIG. 5.

FIG. 6 illustrates an exemplary solenoid assembly 410 used to produce electromagnetic waves that are transmitted through the cables 420. The solenoid assembly 410 includes a central axle 430 about which a wire 440 is helically wound. The axle 430 connects to ground 450. The wire 440 of the solenoid assembly 410 includes a first terminal connection 442 and a second terminal connection 444. The first terminal connection 442 connects to a power source, and the second terminal connection 444 may connect to an activation switch. The solenoid assembly 410 is merely representative of one type of electromagnetic wave-generating assembly; thus, other devices or assemblies for this purpose may be used instead of the solenoid assembly 410.

As with the ultrasonic wave-generating system 300, the electromagnetic wave-generating system 400 may be used in monsoon season or in other periods where the pest populations are particularly high and may be turned off during dry weather or in periods where the pest populations are relatively low. Further, because the air flow into the inlet filter house 102 is not disrupted by the cables 420, the air entering the compressor 15 does not experience the pressure drop associated with the stainless-steel inlet screen described above, thereby allowing the turbine to operate with greater efficiency. Moreover, with both system 300 and system 400, the cost of the energy used to generate the pest-deterring waves is modest, as compared with the cost of the inlet screen.

During periods when the gas turbine 10 experiences down-time (for example, for scheduled maintenance), the systems 300 or 400 may be used to prevent spiders and crawling insects (e.g., ants) from entering the inlet filter house 102. By preventing pests from nesting within the inlet filter house 102, the likelihood of ingestion of the pests and their associated detritus (such as webs, egg sacs, or anthills) is significantly reduced.

A method of deterring pests from entering an inlet filter house of an inlet air filtration system includes the steps of installing a wave-generating system proximate to or on a weather hood on an upstream surface of the inlet filter house; and energizing the wave-generating system to produce energy waves across the upstream surface of the inlet filter house. The wave-generating system may produce ultrasonic waves or electromagnetic waves.

Exemplary embodiments of wave-generating, pest-deterring systems and methods of using the same are described above in detail. The methods and systems described herein are not limited to the specific embodiments described herein, but rather, components of the methods and systems may be utilized independently and separately from other components described herein. For example, the methods and systems described herein may have other applications not limited to practice with inlet air filtration units for power-generating gas turbines, as described herein. Rather, the methods and systems described herein can be implemented and utilized in various other industries.

While the technical advancements have been described in terms of various specific embodiments, those skilled in the art will recognize that the technical advancements can be practiced with modification within the spirit and scope of the claims.

We claim:

1. An inlet air filtration unit for a gas turbine, the inlet air filtration unit comprising:
   an inlet filter house having an upstream surface through which air is ingested;
   a plurality of weather hoods secured to the upstream surface;
   one or more poles located near the upstream surface; and
   a wave-generating system comprising a plurality of ultrasonic speakers installed on the one or more poles proximate to the plurality of weather hoods, the wave-generating system comprising a piezoelectric circuit emitting ultrasonic waves that deter pests from the inlet filter house.

2. An inlet air filtration unit for a gas turbine, the inlet air filtration unit comprising:
   an inlet filter house having an upstream surface through which air is ingested;
   a plurality of weather hoods secured to the upstream surface, wherein each weather hood of the plurality of weather hoods comprises a screen portion, the screen portion being disposed in a downward-facing orientation; and
   a wave-generating system installed on or proximate to the plurality of weather hoods, the wave-generating system emitting waves that deter pests from the inlet filter house, wherein the wave-generating system comprises a cable conveying an electromagnetic field, the cable having a first cable portion secured to a first screen portion of a first weather hood of the plurality of weather hoods.

3. The inlet air filtration unit of claim 2, wherein the first cable portion is secured in a circuitous path across the first screen portion.

4. The inlet air filtration unit of claim 2, wherein the cable comprises a plurality of cable portions including the first cable portion, with respective cable portions being secured to respective screen portions of the plurality of weather hoods.

5. The inlet air filtration unit of claim 4, wherein the cable is continuous and spans the plurality of weather hoods.

6. A method of deterring pests from entering an inlet filter house of an inlet air filtration system, the method comprising the steps of:
   installing a wave-generating system proximate to or on a weather hood on an upstream surface of the inlet filter house, wherein the step of installing the wave-generating system comprises arranging a plurality of ultrasonic speakers to one or more poles near the upstream surface; and
   energizing the wave-generating system to produce energy waves across the upstream surface of the inlet filter house, wherein the step of energizing the wave-generating system to produce energy waves comprises energizing the plurality of ultrasonic speakers to produce ultrasonic waves.

7. A method of deterring pests from entering an inlet filter house of an inlet air filtration system, the method comprising the steps of:
- installing a wave-generating system proximate to or on a weather hood on an upstream surface of the inlet filter house, wherein the weather hood comprises a screen portion, the screen portion being disposed in a downward-facing orientation; and
- energizing the wave-generating system to produce energy waves across the upstream surface of the inlet filter house, wherein the step of energizing the wave-generating system to produce energy waves comprises energizing a cable to produce and convey an electromagnetic field.

8. The method of claim 7, wherein the step of installing the wave-generating system comprises securing the cable to the screen portion of the weather hood.

9. The method of claim 8, wherein the step of installing the wave-generating system comprises securing the cable in a circuitous path across the screen portion.

10. The method of claim 7, wherein the weather hood is one of a plurality of weather hoods, each weather hood of the plurality of weather hoods having a respective screen portion; and wherein the step of installing the wave-generating system comprises securing respective cables to the respective screen portions of the plurality of weather hoods.

* * * * *